United States Patent
Kim et al.

(10) Patent No.: US 9,956,546 B2
(45) Date of Patent: May 1, 2018

(54) CATALYST FOR PRODUCING CARBON NANOTUBES AND CARBON NANOTUBES PRODUCED USING SAME

(71) Applicant: LG CHEM, LTD., Seoul (KR)

(72) Inventors: SungJin Kim, Daejeon (KR); Dong Hyun Cho, Daejeon (KR); KyungYeon Kang, Daejeon (KR); Seungyong Son, Daejeon (KR); Jinmyung Cha, Daejeon (KR); Hyungsik Jang, Daejeon (KR); Seungyong Lee, Daejeon (KR); Jihee Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 38 days.

(21) Appl. No.: 14/439,168

(22) PCT Filed: Sep. 30, 2014

(86) PCT No.: PCT/KR2014/009235
§ 371 (c)(1),
(2) Date: Apr. 28, 2015

(87) PCT Pub. No.: WO2015/047050
PCT Pub. Date: Apr. 2, 2015

(65) Prior Publication Data
US 2015/0273441 A1    Oct. 1, 2015

(30) Foreign Application Priority Data

Sep. 30, 2013 (KR) .................. 10-2013-0116963
Sep. 26, 2014 (KR) .................. 10-2014-0129449
Sep. 30, 2014 (KR) .................. 10-2014-0131338

(51) Int. Cl.
*B01J 23/847* (2006.01)
*C01B 32/162* (2017.01)
(Continued)

(52) U.S. Cl.
CPC ......... *B01J 23/8472* (2013.01); *B01J 21/185* (2013.01); *B01J 23/881* (2013.01);
(Continued)

(58) Field of Classification Search
None
See application file for complete search history.

(56) References Cited

U.S. PATENT DOCUMENTS 7,754,181 B2   7/2010  Silvy et al.
7,923,615 B2   4/2011  Silvy et al.
(Continued)

FOREIGN PATENT DOCUMENTS

JP   2006-111458 A    4/2006
JP   2007-290949 A    11/2007
(Continued)

OTHER PUBLICATIONS

Kathyayini, H. et al, "Synthesis of carbon nanotubes over transition metal ions supported on Al(OH)3", Indian Journal of Chemistry, vol. 47A, May 2008, pp. 663-668.*
(Continued)

*Primary Examiner* — Alexandre F Ferre
*Assistant Examiner* — Elaine M Vazquez
(74) *Attorney, Agent, or Firm* — Dentons US LLP

(57) ABSTRACT

Provided is a supported catalyst for producing carbon nanotubes with a large specific surface area. The supported catalyst enables the production of carbon nanotubes with a large specific surface area in high yield. Therefore, the catalyst can be used in various fields. Also provided are carbon nanotubes produced using the supported catalyst.

12 Claims, 2 Drawing Sheets

(51) Int. Cl.
  *B01J 21/18* (2006.01)
  *B01J 23/89* (2006.01)
  *B01J 35/00* (2006.01)
  *B01J 23/881* (2006.01)
  *B01J 23/882* (2006.01)
  *B01J 35/02* (2006.01)
  *B01J 37/10* (2006.01)
  *B01J 37/08* (2006.01)
  *B01J 37/02* (2006.01)
  *B82Y 30/00* (2011.01)
  *B82Y 40/00* (2011.01)

(52) U.S. Cl.
  CPC ......... *B01J 23/882* (2013.01); *B01J 23/8906* (2013.01); *B01J 23/8913* (2013.01); *B01J 35/002* (2013.01); *B01J 35/023* (2013.01); *C01B 32/162* (2017.08); *B01J 35/0013* (2013.01); *B01J 35/0033* (2013.01); *B01J 37/0203* (2013.01); *B01J 37/0207* (2013.01); *B01J 37/08* (2013.01); *B01J 37/10* (2013.01); *B82Y 30/00* (2013.01); *B82Y 40/00* (2013.01); *C01B 2202/22* (2013.01); *C01B 2202/32* (2013.01); *Y10T 428/2918* (2015.01); *Y10T 428/2982* (2015.01)

(56) References Cited

U.S. PATENT DOCUMENTS 8,834,826 B2 9/2014 Sato
2010/0266478 A1 10/2010 Kim et al.
2011/0212016 A1 9/2011 Lee et al.
2014/0329085 A1 11/2014 Kim et al.

FOREIGN PATENT DOCUMENTS

| JP | 2008-525168 A | 7/2008 |
| JP | 2009-029695 A | 2/2009 |
| JP | 2009-508667 A | 3/2009 |
| JP | 2011-255382 A | 12/2011 |
| JP | 2012-506312 A | 3/2012 |
| KR | 10-2010-0067048 A | 6/2010 |
| KR | 1020130034328 A | 4/2013 |
| KR | 10-2013-0078777 A | 7/2013 |
| WO | 2013/095045 A1 | 6/2013 |

OTHER PUBLICATIONS

Chen et al., "Synthesis of carbon nanofibers: effects of Ni crystal size during methan decomposition", Journal of Catalysis, 229, 82-96, 2005.*
Peigney et al., "Specific surface are of carbon nanotubes and bundles of carbon nanotubes", Carbon, 39, 507-514, 2001.*
Bokobza, "Multiwall carbon nanotube elastomeric composites: A review", Polymer, 48, 4907-4920, 2007.*
Ji, L., Lin, J., and Zeng, H.C., "Metal-Support Interactions in Co/Al2O3 Catalysts: A Comparative Study on Reactivity of Support", J. Phys. Chem. B, 2000, 104, 1783-1790.*
Wen Lu et al, "High performance Electrochemical capacitors from aligned carbon nanotube electrodes and ionic liquid electrolytes", Journal of Power Source, pp. 1270-1277, Jan. 19, 2009.
M.H. Rummeli et al., "Catalyst size dependencies for carbon nanotube synthesis", Research Gate, pp. 3911-3915, Sep. 26, 2007.

* cited by examiner

[Fig. 1]
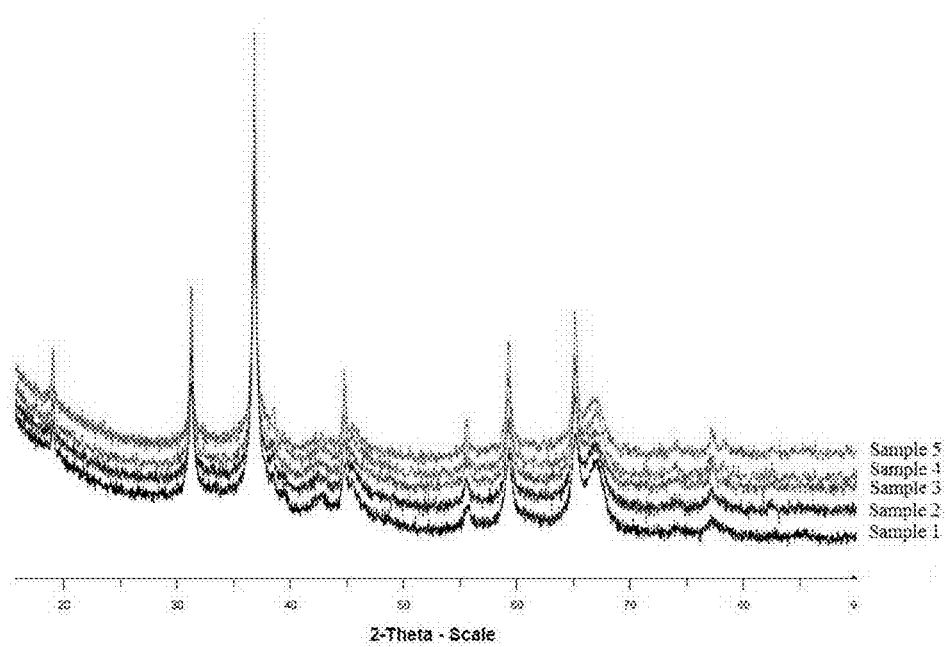
[Fig. 2]
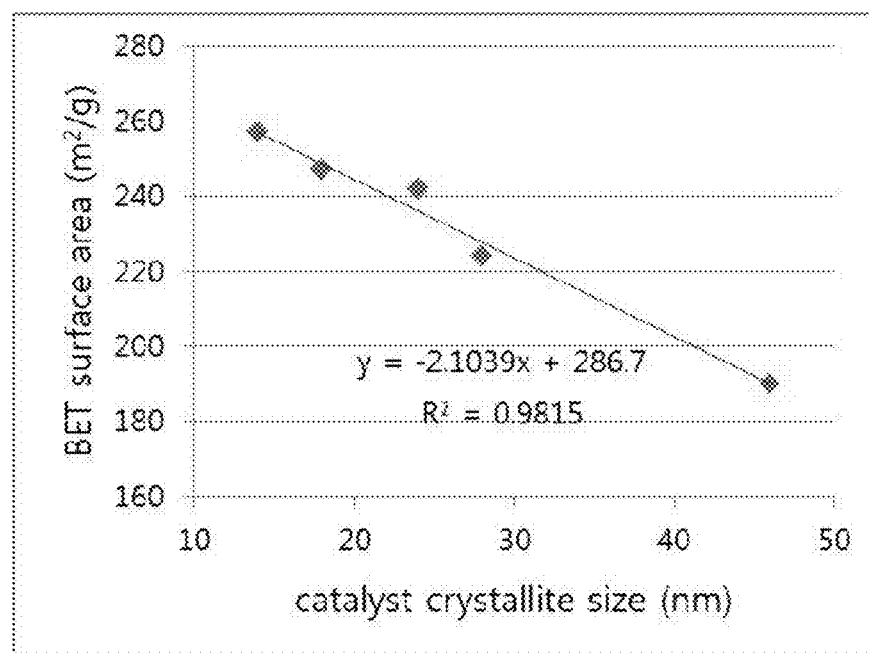

[Fig. 3]
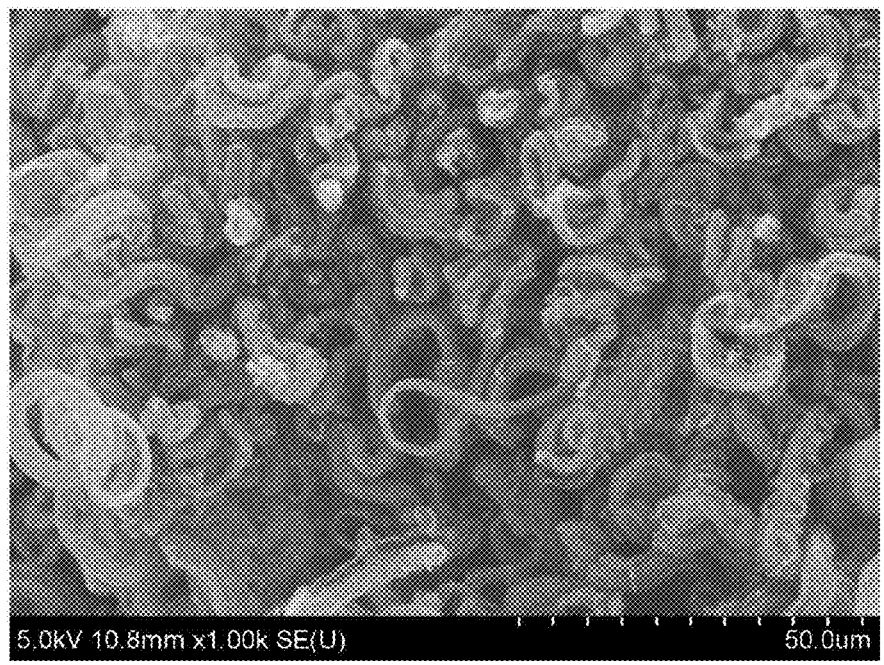
[Fig. 4]
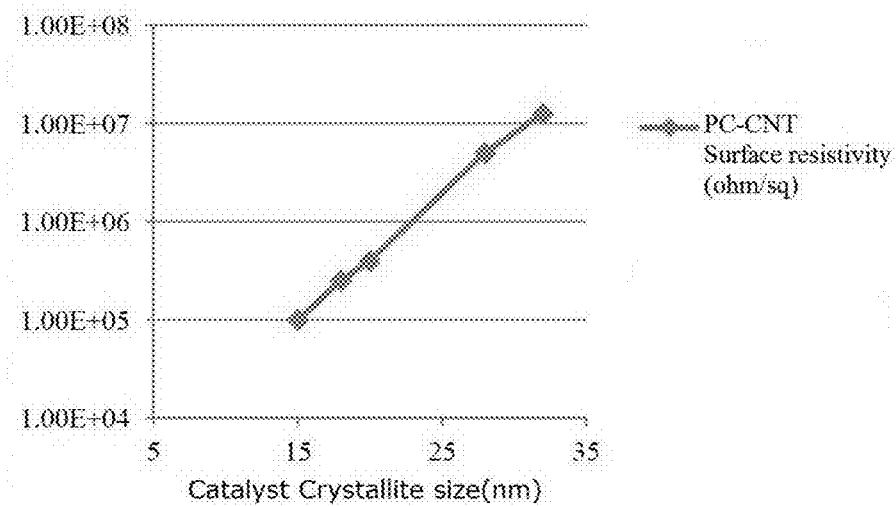

CATALYST FOR PRODUCING CARBON NANOTUBES AND CARBON NANOTUBES PRODUCED USING SAME

This application is a National Stage Entry of International Application No. PCT/KR2014/009235, filed on Sep. 30, 2014, which claims the benefit of Korean Patent Application No. 10-2013-0116963, filed on Sep. 30, 2013, Korean Patent Application No. 10-2014-0129449, filed on Sep. 26, 2014, and Korean Patent Application No. 10-2014-0131338, filed on Sep. 30, 2014, all of which are hereby incorporated herein by reference in their entirety.

BACKGROUND OF THE INVENTION

1. Field of the Invention

The present invention relates to a catalyst for producing carbon nanotubes, and more particularly to a catalyst for producing carbon nanotubes with a large specific surface area and carbon nanotubes produced using the catalyst.

2. Description of the Related Art

Carbon nanostructures (CNSs) refer collectively to nano-sized carbon structures having various shapes, such as nanotubes, nanohairs, fullerenes, nanocones, nanohorns, and nanorods. Carbon nanostructures can be widely utilized in a variety of technological applications because they possess excellent characteristics.

Particularly, carbon nanotubes (CNTs) are tubular materials consisting of carbon atoms arranged in a hexagonal pattern and have a diameter of approximately 1 to 100 nm. CNTs exhibit insulating, conducting or semiconducting properties depending on their inherent chirality. CNTs have a structure in which carbon atoms are strongly covalently bonded to each other. Due to this structure, CNTs have a tensile strength approximately 100 times that of steel, are highly flexible and elastic, and are chemically stable.

CNTs are divided into three types: single-walled CNTs (SWCNTs) consisting of a single sheet and having a diameter of about 1 nm; double-walled CNTs (DWCNTs) consisting of two sheets and having a diameter of about 1.4 to about 3 nm; and multi-walled CNTs (MWCNTs) consisting of three or more sheets and having a diameter of about 5 to about 100 nm.

CNTs are being investigated for their commercialization and application in various industrial fields, for example, aerospace, fuel cell, composite material, biotechnology, pharmaceutical, electrical/electronic, and semiconductor industries, due to their high chemical stability, flexibility and elasticity. However, CNTs have a limitation in directly controlling the diameter and length to industrially applicable dimensions for practical use owing to their primary structure. Accordingly, the industrial application and use of CNTs are limited despite their excellent physical properties.

CNTs are generally produced by various techniques, such as arc discharge, laser ablation, and chemical vapor deposition. However, arc discharge and laser ablation are not appropriate for mass production of CNTs and require high arc production costs or expensive laser equipment. Chemical vapor deposition using a vapor dispersion catalyst has the problems of a very low synthesis rate and too small a size of final CNT particles. Chemical vapor deposition using a substrate-supported catalyst suffers from very low efficiency in the utilization of a reactor space, thus being inappropriate for mass production of CNTs. Thus, studies on catalysts and reaction conditions for chemical vapor deposition are currently underway to increase the yield of CNTs.

A need also exists for CNTs that have a small diameter and can be readily dispersed in and mixed with polymers during compounding with the polymers to manufacture composite materials with improved physical properties.

SUMMARY OF THE INVENTION

It is one object of the present invention to provide a catalyst for producing bundle type CNTs in high yield that have a small diameter and a large specific surface area and are readily dispersible in and miscible with polymers during compounding with the polymers.

It is a further object of the present invention to provide a CNT aggregate produced using the catalyst.

It is another object of the present invention to provide a conductive polymeric composite containing the CNT aggregate.

One aspect of the present invention provides a catalyst for producing carbon nanotubes, including a support and a graphitization metal catalyst supported on the support and having a maximum diffraction peak at a $2\theta$ angle of 35 to 38° in the XRD pattern recorded in the $2\theta$ range of 10° to 80° wherein when the intensity of the maximum diffraction peak and the intensity of a diffraction peak at a $2\theta$ angle of 17 to 22° are defined as "a" and "b", respectively, the ratio b/a is at least 0.08.

The XRD pattern of the catalyst may further have one or more diffraction peaks in the $2\theta$ ranges of 30 to 33°, 43 to 46°, 57 to 60°, and 63 to 67°.

The catalyst may have a crystal size of 3 to 50 nm.

The catalyst may be a supported catalyst obtained by calcining aluminum hydroxide at a primary calcination temperature of 100° C. to 500° C. to form a support, supporting a catalytic metal precursor on the support, and calcining the catalytic metal precursor supported on the support at a secondary calcination temperature of 100° C. to 800° C.

The catalyst may be adjusted to have a particle size of 30 to 150 μm and a number average particle diameter of 40 to 80 μm by sorting.

The graphitization metal catalyst may be selected from the group consisting of nickel (Ni), cobalt (Co), iron (Fe), platinum (Pt), gold (Au), aluminum (Al), chromium (Cr), copper (Cu), magnesium (Mg), manganese (Mn), molybdenum (Mo), rhodium (Rh), silicon (Si), tantalum (Ta), titanium (Ti), tungsten (W), uranium (U), vanadium (V), zirconium (Zr), and alloys thereof.

The graphitization metal catalyst may be a binary or multi-component metal catalyst including a main catalyst and an auxiliary catalyst.

The main catalyst may be selected from Co, Fe, and mixtures thereof and the auxiliary catalyst may be selected from Mo, V, and mixtures thereof.

The graphitization metal catalyst may be a binary metal catalyst selected from Co/Mo, Co/V, Fe/Mo, and Fe/V.

The graphitization metal catalyst may include 0.5-5 moles of the auxiliary catalyst, based on 10 moles of the main catalyst.

The graphitization catalyst may be supported in an amount of 5 to 40 parts by weight, based on 100 parts by weight of the catalyst.

A further aspect of the present invention provides a carbon nanotube aggregate including carbon nanotubes grown on the catalyst wherein the carbon nanotube aggregate has a BET specific surface area of at least 200 m²/g and the BET specific surface area and the crystal size of the catalyst satisfy the following relationship:

$$y \leq -2.1x + 400$$

where y is the BET specific surface area (m²/g) and x is the crystal size of the catalyst (nm).

The BET specific surface area of the carbon nanotube aggregate and the crystal size of the catalyst may satisfy the following relationship:

$$-2.1x+200 \leq y \leq -2.1x+400$$

where y and x are as defined above.

Another aspect of the present invention provides a method for producing a carbon nanotube aggregate, including bringing the catalyst into contact with a carbon source in the gas phase to form carbon nanotubes (CNTs).

The carbon source in the gas phase may be selected from the group consisting of carbon monoxide, methane, ethane, ethylene, ethanol, acetylene, propane, propylene, butane, butadiene, pentane, pentene, cyclopentadiene, hexane, cyclohexane, benzene, toluene, and mixtures thereof.

The catalyst may react with the carbon source at a temperature of 600° C. to 750° C.

Yet another aspect of the present invention provides a composite material including the carbon nanotube aggregate.

The composite material may have a conductivity inversely proportional to the crystal size of the catalyst.

The catalyst of the present invention enables the production of carbon nanotubes (CNTs) that have a large specific surface area and are readily dispersible in and miscible with other materials. Therefore, the CNTs can be used to manufacture a composite material with improved physical properties. As a result, the CNTs are suitable for use in various fields, such as energy materials, functional composites, pharmaceuticals, batteries, semiconductors, and display devices.

BRIEF DESCRIPTION OF THE DRAWINGS

FIG. 1 shows XRD patterns of catalyst samples prepared in Example 1.

FIG. 2 is a graph showing the correlation between the crystal sizes of catalysts prepared in Example 1 and the BET specific surface areas of CNT aggregates produced using the catalysts.

FIG. 3 is a SEM image of a CNT aggregate produced in Example 1.

FIG. 4 is a graph showing the correlation between the surface resistivity values of polymeric composites containing CNT aggregates produced in Example 1 and the crystal sizes of catalysts used in the production of the CNT aggregates.

DETAILED DESCRIPTION OF THE INVENTION

The present invention will now be described in more detail.

The present invention is directed to a supported catalyst whose crystal size is controlled by optimizing the processing conditions for the pretreatment of a support and the formation of the supported catalyst. The present invention is also directed to a CNT aggregate with a small diameter and a large specific surface area produced using the supported catalyst and a polymeric composite with controlled conductivity containing the CNT aggregate.

The catalyst of the present invention includes a support and a graphitization metal catalyst supported on the support and has a maximum diffraction peak at a 2θ angle of 35 to 38° in the XRD pattern recorded in the 2θ range of 10° to 80° wherein when the intensity of the maximum diffraction peak and the intensity of a diffraction peak at a 2θ angle of 17 to 22° are defined as "a" and "b", respectively, the ratio b/a is at least 0.08.

According to one embodiment, the ratio b/a may be 0.15 or less, from 0.09 to 0.15 or from 0.09 to 0.13.

FIG. 1 shows XRD patterns of samples of a catalyst according to one embodiment of the present invention. As shown in FIG. 1, the XRD pattern of the catalyst may further have one or more diffraction peaks in the 2θ ranges of 30 to 33°, 43 to 46°, 57 to 60°, and 63 to 67°.

According to one embodiment, the intensity of the diffraction peak at a 2θ angle of 30 to 33° may be from 0.3 to 0.5 times or from 0.35 to 0.45 times that of the maximum diffraction peak.

The intensity of the diffraction peak at a 2θ angle of 43 to 46° may be from 0.1 to 0.3 times or from 0.15 to 0.25 times that of the maximum diffraction peak.

The intensity of the diffraction peak at a 2θ angle of 57 to 60° may be from 0.1 to 0.25 times or from 0.15 to 0.22 times that of the maximum diffraction peak.

The intensity of the diffraction peak at a 2θ angle of 63 to 67° may be from 0.3 to 0.5 times or from 0.35 to 0.45 times that of the maximum diffraction peak.

The crystal size of the catalyst may be controlled in the range of 3 to 50 nm or 10 nm to 50 nm by varying calcination conditions for the production of the catalyst, that is, the kind of the catalytic metal, the amount of the catalytic metal supported, the amount of the catalytic metal calcined, and the calcination time and temperature.

The "crystal size" of the catalyst is also referred to as a "crystallite size". The terms "crystal size" and "crystallite size" are used interchangeably herein. The crystallite size of the catalyst is calculated from the broadening of the peaks observed in the XRD pattern. More specifically, the crystallite size of the catalyst is calculated by full pattern fitting using a fundamental approach in the Bruker TOPAS program with a Bragg-Brentano diffractometer in a mode where the angle of incidence is half of 2 theta. Thus, the crystallite size of the catalyst should be distinguished from the particle diameter and particle size of the catalyst determined by SEM imaging. Measurement and calculation of the crystallite size are made in accordance with standard methods known in the art, and detailed descriptions thereof are thus omitted.

As shown in FIG. 2, as the catalyst of the present invention increases in crystal size, the resulting CNT aggregate tends to decrease in BET specific surface area.

Specifically, the CNT aggregate produced using the catalyst of the present invention has a BET specific surface area of at least 200 m²/g, and the BET specific surface area and the crystal size of the catalyst satisfy the following relationship:

$$y \leq -2.1x+400$$

where y is the BET specific surface area (m²/g) and x is the crystal size of the catalyst (nm).

More preferably, the specific surface area of the CNT aggregate and the crystal size of the catalyst satisfy one or more of the following relationships:

$$-2.1x+200 \leq y \leq -2.1x+400$$

$$-2.1x+250 \leq y \leq -2.1x+350$$

$$-2.1x+250 \leq y \leq -2.1x+300$$

$$-2.1x+270 \leq y \leq -2.1x+320$$

$$-2.1x+270 \leq y \leq -2.1x+300$$

The specific surface area of the CNT aggregate is measured by the BET method. Specifically, the specific surface area of the CNT aggregate is calculated by measuring the amount of nitrogen gas adsorbed at the temperature of liquid nitrogen (77 K) using BELSORP-mini II (BEL Japan).

The CNT aggregate of the present invention may have a BET specific surface area of 200 to 500 $m^2/g$, 200 to 300 $m^2/g$, 300 to 500 $m^2/g$, 300 to 400 $m^2/g$ or 200 to 400 $m^2/g$.

A larger BET specific surface area of the CNT aggregate indicates a smaller diameter of the CNT aggregate.

As the CNT aggregate of the present invention increases in specific surface area, the polymeric compound containing the CNT aggregate tends to increase in electrical conductivity. The conductivity of the CNT-containing polymeric compound is considered to be affected by the physical properties (e.g., diameter and crystallinity) of the CNT aggregate and the dispersibility (associated with the shape of the CNTs) of the CNT aggregate upon compounding.

The relationship between the crystal size of the catalyst and the surface resistivity of the polymeric composite containing the CNT aggregate produced using the catalyst is shown in FIG. 4.

Referring to this relationship, when the catalyst is controlled to have a small crystal size, the CNT aggregate has a large specific surface area (i.e. a small diameter), resulting in high conductivity of the polymeric compound.

According to one embodiment of the present invention, the supported catalyst is prepared by primarily calcining a support precursor at a primary calcination temperature, for example, a temperature of 100° C. to 500° C., to obtain a support, supporting a graphitization catalyst on the support, and secondarily calcining the catalytic metal precursor supported on the support at a temperature of 100° C. to 800° C.

The carbon nanotube aggregate is produced by bringing the supported catalyst into contact with a carbon source in the gas phase. Preferably, the carbon nanotube aggregate thus produced is of a bundle type and has a BET specific surface area of at least 200 $m^2/g$ (see FIG. 3).

Unless otherwise mentioned, the term "bundle type" used herein refers to a secondary shape of CNTs in which the CNTs are arranged in parallel or get entangled to form bundles or ropes, and the term "non-bundle or entangled type" used herein refers to a type of carbon nanotubes that does not have a specific shape such as a bundle- or rope-like shape.

The support precursor serves to support the graphitization catalyst and can control the shape of CNTs depending on the kind thereof.

As the support precursor, there may be used, for example, an aluminum-based support precursor. The support precursor is preferably aluminum trihydroxide (ATH). The support precursor may be dried at 50 to 150° C. for 1 to 24 hours before use.

The primary calcination temperature is preferably lower than 500° C. and is much lower than 700° C. known as the temperature at which aluminum trihydroxide is converted to alumina. Specifically, the primary calcination may include heat treatment at a temperature of about 100 to about 500° C., about 120 to about 450° C., about 200 to about 450° C., about 300 to about 450° C., or about 200 to about 400° C.

The aluminum (Al)-based support thus prepared preferably includes 30% by weight or more of AlO(OH), which is converted from Al(OH)$_3$, but does not include Al$_2$O$_3$.

The aluminum (Al)-based support may further include at least one oxide selected from the group consisting of ZrO$_2$, MgO, and SiO$_2$. The aluminum (Al)-based support may be spherical or potato-like in shape and may have a structure suitable to provide a relatively large surface area per unit weight or volume, such as a porous structure, a molecular sieve structure or a honeycomb structure. According to one embodiment, the support precursor may have a primary particle diameter of about 20 to about 200 μm, a porosity of about 0.1 to about 1.0 $cm^3/g$, and a specific surface area smaller than about 1 $m^2/g$.

The primary calcination time may be in the range of about 0.5 to about 10 hours, preferably about 1 to about 5 hours, but is not limited to this range.

The graphitization catalyst may be brought into contact with a carbon source in the gas phase to form CNTs. A detailed description will be given of the growth of CNTs. First, a carbonaceous material as the gas-phase carbon source is brought into contact with the graphitization catalyst, for example, a graphitization metal catalyst, followed by heat treatment. As a result of the heat treatment, the carbonaceous material is thermally decomposed on the surface of the metal catalyst and carbon atoms formed from the carbon-containing gas as a result of the decomposition are infiltrated into and solubilized in the graphitization metal catalyst. If the amount of the carbon atoms infiltrated exceeds the solubility limit, an inherent feature of the graphitization metal catalyst, the carbon atoms form nuclei, which grow into CNTs.

The graphitization metal catalyst plays a role in helping the carbon components present in the carbonaceous material bind to each other to form hexagonal ring structures. The graphitization metal catalyst may be, for example, a catalyst for graphite synthesis, carbonization induction or CNT production. More specifically, the graphitization metal catalyst may be selected from the group consisting of nickel (Ni), cobalt (Co), iron (Fe), platinum (Pt), gold (Au), aluminum (Al), chromium (Cr), copper (Cu), magnesium (Mg), manganese (Mn), molybdenum (Mo), rhodium (Rh), silicon (Si), tantalum (Ta), titanium (Ti), tungsten (W), uranium (U), vanadium (V), zirconium (Zr), and alloys thereof.

The graphitization catalyst may be a binary or multi-component metal system. The binary or multi-component graphitization catalyst may include a main catalyst and an auxiliary catalyst. As the main catalyst, there may be used, for example, Co, Fe or Ni. As the auxiliary catalyst, there may be used, for example, Mo or V. Examples of suitable binary or multi-component graphitization catalysts include Co/Mo, Co/V, Fe/Mo, Fe/V, Fe/Co, Fe/Co/V, Fe/Co/Mo, Co/Mo/V, Fe/Mo/V, and Fe/Co/Mo/V. More preferred are binary or multi-component graphitization catalysts including Co and V.

The binary graphitization catalyst may include 0.1 to 10 moles or 0.5 to 5 moles of the auxiliary catalyst, based on 10 moles of the main catalyst.

The graphitization catalyst is supported in the form of a precursor, for example, a metal salt, a metal oxide or a metal compound, on the support. Examples of suitable precursors of the graphitization catalyst include Fe salts, Fe oxides, Fe compounds, Ni salts, Ni oxides, Ni compounds, Co salts, Co oxides, Co compounds, Mo oxides, Mo compounds, Mo salts, V oxides, V compounds, and V salts. Other examples of suitable precursors include Fe(NO$_3$)$_2$.6H$_2$O, Fe(NO$_3$)$_2$.9H$_2$O, Fe(NO$_3$)$_3$, Fe(OAc)$_2$, Ni(NO$_3$)$_2$.6H$_2$O, Co(NO$_3$)$_2$.6H$_2$O, Co$_2$(CO)$_8$, [Co$_2$(CO)$_6$(t-BuC≡CH)], Co(OAc)$_2$, (NH$_4$)$_6$Mo$_7$O$_{24}$.4H$_2$O, Mo(CO)$_6$, (NH$_4$)MoS$_4$, and NH$_4$VO$_3$.

The precursor of the graphitization catalyst is supported in the form of a solution on the support, followed by secondary calcination. As a result of the secondary calcination, the precursor is supported in the form of a metal oxide in the supported catalyst.

More specifically, the supported catalyst for CNT production can be prepared by a method including: mixing a support, for example, a granular aluminum-based support, with an aqueous solution of a graphitization catalyst precursor; and drying the mixture under vacuum, primarily calcining the vacuum-dried at a temperature of about 100° C. to about 500° C. to form a support, supporting a graphitization metal catalyst on the support, and secondarily calcining the catalyst supported on the support at a temperature of 100° C. to 800° C.

According to one embodiment, the vacuum drying may be performed by rotary evaporation under vacuum at a temperature ranging from about 40 to about 100° C. for a time ranging from about 30 minutes to about 12 hours.

According to one embodiment, the method may further include aging with rotation or stirring at about 45 to about 80° C. before the vacuum drying. The aging may be performed for a maximum of 5 hours, for example, 20 minutes to 5 hours or 1 to 4 hours.

The secondary calcination is performed at a temperature of about 100° C. to about 800° C., for example, about 200° C. to about 800° C. or about 550° C. to about 800° C., to prepare the supported catalyst. It is preferred that the secondary calcination temperature is higher by 200 to 400° C. than the primary calcination temperature.

The supported catalyst prepared by the method may have a particle diameter (or an average particle diameter) of about 30 to about 150 μm, as measured before the secondary calcination, and each of the granular support and the graphitization catalyst may have a spherical or potato-like shape with a primary particle diameter of about 10 to about 50 nm. The spherical or potato-like shape refers to a three-dimensional shape having an aspect ratio of 1.2 or less such as a sphere or ellipse.

According to one embodiment of the present invention, CNTs may be produced using a fluidized bed reactor. In this embodiment, the supported catalyst may be adjusted to have a particle diameter of about 30 to about 150 μm and a number average particle diameter (Mn) of 40 to 80 μm or 50 to 70 μm by sorting before use. The reason for this sorting is because it is important that the catalyst fluidized bed is allowed to flow freely in the reaction zone of the fluidized bed reactor while preventing the catalyst from aggregating.

According to one embodiment, the supported catalyst may include about 5 to about 40 parts by weight of the graphitization catalyst, based on 100 parts by weight of the supported catalyst. However, the content of the graphitization catalyst is not limited to this range.

In the case where the supported catalyst includes a Co-based graphitization catalyst, the Co content may be from about 3 to about 100 moles, based on 100 moles of the support.

According to one embodiment, the supported catalyst may have a structure in which the surface and pores of the granular support, preferably the aluminum-based support, are coated with a monolayer or multilayer of the graphitization catalyst.

The supported catalyst is preferably prepared by an impregnation method for the following reasons: the supported catalyst has a higher inherent bulk density than coprecipitated catalysts; unlike coprecipitated catalysts, the supported catalyst produces a small amount of a fine powder with a size of 10 microns or less, which reduces the possibility of occurrence of a fine powder due to attrition during fluidization; and high mechanical strength of the supported catalyst effectively stabilizes the operation of a fluidized bed reactor.

The use of the supported catalyst allows for growth of CNTs by chemical vapor synthesis through decomposition of a carbon source, leading to the production of CNTs.

According to the chemical vapor synthesis, the graphitization catalyst is charged into a reactor and a carbon source in the gas phase is then supplied to the reactor at ambient pressure and high temperature to produce CNTs. A hydrocarbon as the carbon source is thermally decomposed and is infiltrated into and saturated in the graphitization catalyst. Carbon is deposited from the saturated graphitization catalyst and forms hexagonal ring structures.

The chemical vapor synthesis can be performed in such a manner that the supported catalyst is fed into a horizontal fixed bed reactor or fluidized bed reactor and at least one carbon source selected from $C_1$-$C_6$ saturated or unsaturated hydrocarbons, and optionally together with a mixed gas of a reducing gas (e.g., hydrogen) and a carrier gas (e.g., nitrogen) is introduced into the reactor. CNTs may be grown for 30 minutes to 8 hours after the carbon source is introduced into the supported catalyst.

According to one embodiment of the present invention, CNTs may be produced using a fluidized bed reactor. In this embodiment, a gas supply port is preferably formed at the bottom of the fluidized bed reactor. A supply gas flows through the gas supply port to prevent the catalyst particles from aggregating or to separate the aggregated catalyst particles into individual particles. The supply gas may be a mixed gas of a carbon source and a reducing gas, a carrier gas or a mixture thereof.

The type of a heat source for the calcination or heat treatment in the method is not limited and may be, for example, induction heating, radiant heating, laser, IR, microwave, plasma, UV or surface plasmon heating.

Any carbon source that can supply carbon and can exist in the gas phase at a temperature of 300° C. or more may be used without particular limitation for the chemical vapor synthesis. The gas-phase carbonaceous material may be any carbon-containing compound. The gas-phase carbonaceous material is preferably a compound consisting of up to 6 carbon atoms, more preferably a compound consisting of up to 4 carbon atoms. Examples of such gas-phase carbonaceous materials include, but are not limited to, carbon monoxide, methane, ethane, ethylene, ethanol, acetylene, propane, propylene, butane, butadiene, pentane, pentene, cyclopentadiene, hexane, cyclohexane, benzene, and toluene. These gas-phase carbonaceous materials may be used alone or as a mixture thereof. The mixed gas of hydrogen and nitrogen transports the carbon source, prevents CNTs from burning at high temperature, and assists in the decomposition of the carbon source.

The gas-phase carbon source, hydrogen, and nitrogen may be used in various volume ratios, for example, 0.1-10:0-10:1 or 0.5-1.5:0.5-1.5:1. The flow rate of the reaction gases may be appropriately determined in the range of about 100 to about 10,000 sccm.

After growth of CNTs by the heat treatment at high temperature, the CNTs are cooled. Due to this cooling, the CNTs are more regularly aligned. The CNTs may be naturally cooled (i.e. by removal of the heat source) or may be cooled at a rate of about 5 to about 30° C./min.

The CNTs thus produced are of a bundle type and have a BET specific surface area of at least about 200 $m^2$/g, preferably about 200 $m^2$/g to about 500 $m^2$/g. The specific surface area can be measured by the BET method.

Particularly, the method enables the production of CNTs in high yield, for example, about 5 times to about 50 times or about 10 times to 40 times. The yield of the carbon nanotubes can be determined by measuring the content of the carbon nanotubes obtained at room temperature using an electronic scale. The reaction yield can be calculated by substituting the weight of the supported catalyst used and the total weight after the reaction into the following expression:

CNT yield (times)=(the total weight after the reaction (g)−the weight of the supported catalyst used (g))/the weight of the supported catalyst used (g)

The CNTs may be of a bundle type with an aspect ratio of about 0.9 to about 1. In addition, the CNTs may have a strand diameter of about 2 nm to about 20 nm, preferably about 3 nm to about 8 nm. The strand diameter of the CNTs decreases with increasing BET specific surface area.

The aspect ratio can be defined by the following expression:

Aspect ratio=the shortest diameter passing through the center of CNT/the longest diameter passing through the center of CNT As described above, the CNTs have a large BET specific surface area, i.e. a small diameter, and are of a bundle type. Based on such characteristics, the CNTs are readily dispersible in and miscible with other materials, for example, polymers, and can thus be used to manufacture composite materials with improved physical properties.

Therefore, the CNTs are suitable for use in the manufacture of various display devices, such as LCDs, OLEDs, PDPs, and e-papers, electrode structures, such as solar cells, fuel cells, lithium batteries, and supercapacitors, functional composite materials, energy materials, pharmaceuticals, and semiconductors, such as FETs.

The following examples are provided to assist in understanding the invention. However, it will be obvious to those skilled in the art that these examples are merely illustrative and various modifications and changes are possible without departing from the scope and spirit of the invention. Accordingly, it should be understood that such modifications and changes are encompassed within the scope of the appended claims.

Example 1

A. Preparation of Aqueous Solution of Graphitization Metal Catalyst Precursor A Co—V metal catalyst as a graphitization catalyst was prepared by the following procedure.

Citric acid was added to a solution of $NH_4VO_3$ as a V precursor in 20 ml water in flask A, and then $Co(NO_3)_2 \cdot 6H_2O$ as a Co precursor was added thereto to prepare an aqueous metal solution. The V precursor and the Co precursor were added in such amounts that the molar ratio of Co:V was 10:1. The aqueous metal solution was observed to be clear and free of precipitates.

B. Preparation of Supports

Aluminum trihydroxide ($Al(OH)_3$, ATH) as an aluminum-based support precursor was calcined at different temperatures of 250 to 500° C. for 4 h to obtain supports. The calcination temperatures are shown in Table 2. 20 g of each support was placed in flask B. XRD analysis revealed the presence of 40 wt % of AlO(OH) in the calcined support.

C. Preparation of Supported Catalysts 40 g of the solution in flask A was added to flask B such that the numbers of moles of Co and V were 30 moles and 3 moles, respectively, when the number of moles of the support (20 g) was assumed to be 100 moles. The graphitization catalytic metal precursor was sufficiently supported on the support and aged with stirring in a thermostatic bath at 60° C. for 5 min. The aged graphitization catalyst supported on the support was rotated at 80 rpm and dried under vacuum for 60 min while maintaining the temperature. The dried catalyst was secondarily calcined at 675° C. for 4 h to produce a supported catalyst.

The phases of the catalyst samples 1 to 5 were analyzed and the crystal sizes of the catalyst samples were measured using XRD system. The specifications of the XRD system are as follows:

Bruker AXS D4 Endeavor XRD (voltage: 40 kV, current: 40 mA)
Cu Kα radiation (wavelength: 1.54 Å)
LynxEye position sensitive detector (3.7° slit)

The XRD patterns of the catalyst samples are shown in FIG. 1 and the diffraction peaks are shown in Table 1. The XRD patterns were substantially the same regardless of the crystal sizes.

TABLE 1

| 2θ (Cu Kα) | Sample 1 | Sample2 | Sample 3 | Sample 4 | Sample 5 |
|---|---|---|---|---|---|
| 19.0 | 11 | 10 | 11 | 11 | 12 |
| 31.2 | 41 | 39 | 41 | 40 | 39 |
| 36.8 | 100 | 100 | 100 | 100 | 100 |
| 44.8 | 23 | 20 | 20 | 17 | 17 |
| 55.6 | 8 | 9 | 9 | 10 | 10 |
| 59.3 | 18 | 18 | 18 | 19 | 19 |
| 65.2 | 40 | 40 | 41 | 42 | 43 |

Supported catalysts were produced in the same manner as above, except that the Co content was changed as shown in Table 2. The crystal sizes of the supported catalysts were calculated by full pattern fitting and, together with the Co contents and the calcination temperatures, are shown in Table 2.

TABLE 2

| Sample | Catalyst/Calcination temperatures (° C.) | Co content (wt %) | Crystal size (nm) |
|---|---|---|---|
| 1 | CoV/400-675 | 10 | 14 |
| 2 | CoV/400-675 | 12.7 | 18 |
| 3 | CoV/400-675 | 15 | 24 |
| 4 | CoV/500-675 | 15 | 28 |
| 5 | CoV/250-675 | 15 | 46 |

D. CNT Synthesis

A test for the synthesis of CNTs using each of the supported catalysts was conducted in a fluidized bed reactor on a laboratory scale. Specifically, each of the supported catalysts prepared in C was placed in a quartz tube reactor having an inner diameter of 58 mm and a length of 1200 mm and heated to 675° C. under a nitrogen atmosphere. A mixed gas of nitrogen, hydrogen and ethylene gas in a volume ratio of 5.5:1:1 was allowed to flow at a rate of 4000 ml/min for a total of 2 h while maintaining the same temperature, affording a CNT aggregate.

The specific surface areas and yields of the CNT aggregates are shown in Table 3. The specific surface areas were measured by the BET method. Specifically, the specific surface areas were calculated by measuring the amount of nitrogen gas adsorbed at the temperature of liquid nitrogen (77 K) using BELSORP-mini II (BEL Japan).

TABLE 3

| Sample | Crystal size (nm) | BET specific surface area (m²/g) | Yield (times) |
|---|---|---|---|
| 1 | 14 | 257 | 14 |
| 2 | 18 | 247 | 16.4 |
| 3 | 24 | 242 | 22 |
| 4 | 28 | 224 | 22.7 |
| 5 | 46 | 190 | 14 |

The relationship between the crystal sizes of the catalysts and the BET specific surface areas of the CNT aggregates is shown in FIG. 2.

As shown in FIG. 2, the crystal size of the catalysts is inversely proportional to the specific surface area of the CNT aggregates, that is, as the crystal size of the catalysts decreases, the specific surface area of the CNT aggregates increases.

FIG. 3 is a SEM image of one of the CNT aggregates. FIG. 3 reveals that the CNT aggregate has a bundle type.

Measurement of Conductivities of the Polymeric Composites 3 wt % of each CNT aggregate was mixed with polycarbonate (MI 22). The mixture was melt extruded using a twin-screw extruder at 240-280° C. to manufacture a compound in the form of pellets. A specimen of the compound was prepared for conductivity measurement. The surface resistivity of the specimen was measured using a surface resistivity meter (SRM-110, PINION).

The relationship between the surface resistivity values of the polymeric composites and the crystal sizes of the catalysts is shown in FIG. 4.

FIG. 4 reveals that as the crystal size of the catalysts decreases, the surface resistivity of the polymeric composites decreases, that is, the conductivity of the polymeric composites increases. This can be considered to be associated with an increase in the specific surface area of the CNT aggregates with decreasing crystal size of the catalysts.

In conclusion, the specific surface area of the CNT aggregates and the conductivity of the polymeric composites including the CNT aggregates can be controlled by varying the crystal size of the supported catalysts.

What is claimed is:

1. A catalyst for producing carbon nanotubes, comprising a support and a graphitization metal catalyst supported on the support and having a maximum diffraction peak at a 2θ angle of 35 to 38° in the XRD pattern recorded in the 2θ range of 10° to 80° wherein when the intensity of the maximum diffraction peak and the intensity of a diffraction peak at a 2θ angle of 17 to 22° are defined as "a" and "b", respectively, the ratio b/a is 0.09 to 0.15,
wherein when the intensity of a diffraction peak at a 2θ angle of 63 to 67° is defined as "c", the ratio c/a is in a range of 0.3 to 0.5,
wherein the graphitization metal catalyst is a multi-component metal catalyst comprising a main catalyst and an auxiliary catalyst,
wherein the main catalyst is selected from Co, Fe, and mixtures thereof and the auxiliary catalyst is V, and
wherein the catalyst is a supported catalyst obtained by calcining aluminum hydroxide at a primary calcination temperature of 250° C. to 500° C. to form the support, supporting a catalytic metal precursor on the support, and calcining the catalytic metal precursor supported on the support at a secondary calcination temperature of 450° C. to 800° C., the secondary calcination temperature being higher by 200 to 400° C. than the primary calcination temperature, and
wherein the catalyst has a crystal size of 3 to 50 nm.

2. The catalyst according to claim 1, wherein the catalyst further has one or more diffraction peaks at 2θ angles of 30 to 33°, 43 to 46°, and 57 to 60.

3. The catalyst according to claim 1, wherein the catalyst is adjusted to have a particle size of 30 to 150 μm and a number average particle diameter of 40 to 80 μm by sorting.

4. The catalyst according to claim 1, wherein the graphitization metal catalyst comprises 0.1-10 moles of the auxiliary catalyst, based on 10 moles of the main catalyst.

5. The catalyst according to claim 1, wherein the graphitization metal catalyst is supported in an amount of 5 to 40 parts by weight, based on 100 parts by weight of the catalyst.

6. A carbon nanotube aggregate comprising carbon nanotubes grown on the catalyst according to claim 1 wherein the carbon nanotube aggregate has a BET specific surface area of at least 200 m²/g and the BET specific surface area and the crystal size of the catalyst satisfy the following relationship:

$$y \leq -2.1x+400$$

where y is the BET specific surface area (m²/g) and x is the crystal size of the catalyst (nm).

7. The carbon nanotube aggregate according to claim 6, wherein the BET specific surface area of the carbon nanotube aggregate and the crystal size of the catalyst satisfy the following relationship:

$$-2.1x+200 \leq y \leq -2.1x+400$$

where y is the BET specific surface area (m²/g) and x is the crystal size of the catalyst (nm).

8. A composite material comprising the carbon nanotube aggregate according to claim 6.

9. The composite material according to claim 8, wherein the composite material has a conductivity inversely proportional to the crystal size of the catalyst.

10. A method for producing a carbon nanotube aggregate, comprising bringing the catalyst according to claim 1 into contact with a carbon source in the gas phase to form carbon nanotubes (CNTs).

11. The method according to claim 10, wherein the carbon source in the gas phase is selected from the group consisting of carbon monoxide, methane, ethane, ethylene, ethanol, acetylene, propane, propylene, butane, butadiene, pentane, pentene, cyclopentadiene, hexane, cyclohexane, benzene, toluene, and mixtures thereof.

12. The method according to claim 10, wherein the catalyst reacts with the carbon source at a temperature of 600° C. to 750° C.

* * * * *